United States Patent
Kagawa et al.

(10) Patent No.: US 10,755,614 B2
(45) Date of Patent: Aug. 25, 2020

(54) IMAGE PROJECTION APPARATUS, ITS CONTROL METHOD, AND STORAGE MEDIUM

(71) Applicant: CANON KABUSHIKI KAISHA, Tokyo (JP)

(72) Inventors: Tetsuya Kagawa, Beijing (CN); Masao Ono, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/425,191

(22) Filed: May 29, 2019

(65) Prior Publication Data

US 2019/0371218 A1 Dec. 5, 2019

(30) Foreign Application Priority Data

May 30, 2018 (JP) .................................. 2018-103768

(51) Int. Cl.
*G09G 5/10* (2006.01)
*G09G 3/00* (2006.01)
(Continued)

(52) U.S. Cl.
CPC ........... *G09G 3/002* (2013.01); *G03B 21/006* (2013.01); *G03B 33/12* (2013.01); *G09G 3/3607* (2013.01);
(Continued)

(58) Field of Classification Search
CPC .... G09G 3/002; G09G 3/2014; G09G 3/2022; G09G 3/2081; G09G 3/3607;
(Continued)

(56) References Cited

U.S. PATENT DOCUMENTS 9,400,416 B2 * 7/2016 Takahashi ............ G03B 21/142
10,366,661 B2 * 7/2019 Ono ........................ G09G 3/002
(Continued)

FOREIGN PATENT DOCUMENTS

JP          H0854859 A      2/1996
JP          H1141615 A      2/1999
(Continued)

OTHER PUBLICATIONS

English translation of Japanese Pub. No. JP 2011-150004 A, Takashi et al, 17 pages, Aug. 4, 2011.*
(Continued)

*Primary Examiner* — Joe H Cheng
(74) *Attorney, Agent, or Firm* — Carter, DeLuca & Farrell LLP

(57) ABSTRACT

An image projection apparatus includes light modulation elements each including a plurality of pixels, and configured to modulate lights having wavelengths different from each other, and a driver configured to generate a first voltage commonly applied to the plurality of pixels in each of the plurality of light modulation elements, and a second voltage configured to determine a maximum value of a ratio of a light amount of exit light to a light amount of incident light of the plurality of pixels, and to drive the plurality of light modulation elements through a pulse width modulation of the second voltage for each pixel according to an input image signal. The driver sets the second voltage to at least one light modulation element among the plurality of light modulation elements, which is different from that of another light modulation element and drives the light modulation elements.

11 Claims, 15 Drawing Sheets

(51) Int. Cl.
*G03B 21/00* (2006.01)
*G03B 33/12* (2006.01)
*G09G 3/36* (2006.01)

(52) U.S. Cl.
CPC ............... *G09G 2320/0242* (2013.01); *G09G 2320/0271* (2013.01); *G09G 2320/0646* (2013.01); *G09G 2320/0666* (2013.01)

(58) Field of Classification Search
CPC ... G09G 2310/0235; G09G 2320/0242; G09G 2320/0271; G09G 2320/0646; G09G 2320/0666; G03B 21/00; G03B 21/006; G03B 33/12; H04N 9/31
See application file for complete search history.

(56) References Cited

U.S. PATENT DOCUMENTS

| | | | | |
|---|---|---|---|---|
| 2003/0086166 | A1* | 5/2003 | Ramanujan | B41J 2/465 359/464 |
| 2006/0215122 | A1* | 9/2006 | Hong | H04N 9/3111 353/31 |
| 2006/0221020 | A1* | 10/2006 | Winer | G09G 3/2014 345/84 |
| 2008/0062158 | A1* | 3/2008 | Willis | G09G 3/3622 345/204 |
| 2009/0102828 | A1* | 4/2009 | Arai | G02B 26/0841 345/213 |
| 2011/0205600 | A1* | 8/2011 | Hibiya | G02B 26/101 358/474 |
| 2012/0019785 | A1* | 1/2012 | Tseng | G03B 21/2013 353/31 |
| 2015/0271893 | A1* | 9/2015 | Lee | G09G 3/36 315/186 |
| 2015/0338631 | A1* | 11/2015 | Matsumoto | G02B 21/082 359/316 |

FOREIGN PATENT DOCUMENTS

| | | |
|---|---|---|
| JP | 2008026613 A | 2/2008 |
| JP | 2008096500 A | 4/2008 |
| JP | 2011150004 A | 8/2011 |
| JP | 4909665 B2 | 4/2012 |
| JP | 4998573 B2 | 8/2012 |

OTHER PUBLICATIONS

Notice of Reasons for Refusal issued by the Japan Patent Office dated Mar. 17, 2020 in corresponding JP Patent Application No. 2018-103768, with English translation.

* cited by examiner

◄———————— 1 FRAME ————————►

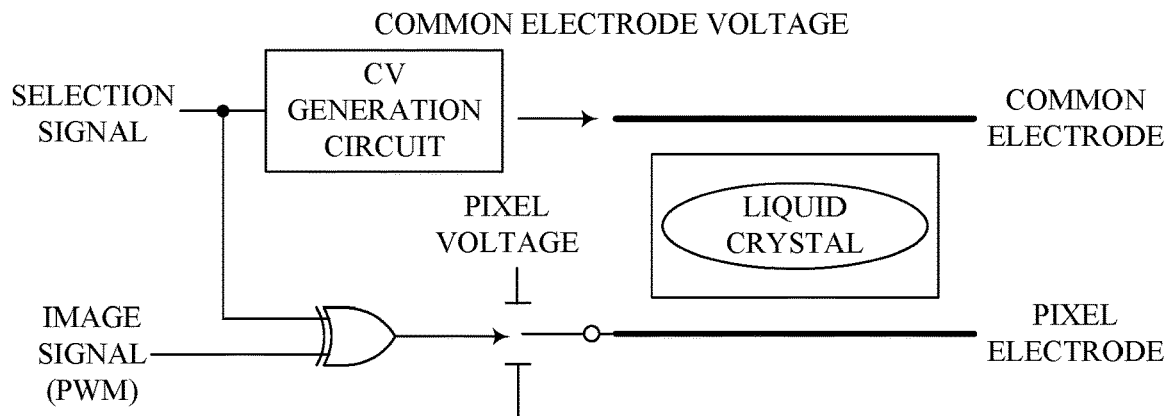
FIG. 18A
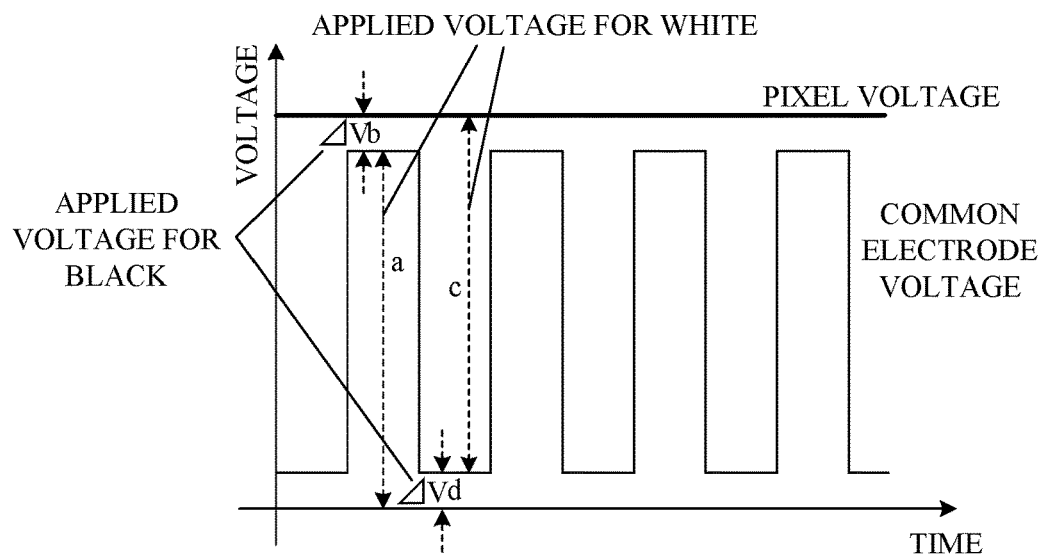
FIG. 18B
| SELECTION SIGNAL | IMAGE SIGNAL | STATE OF SW | PIXEL VOLTAGE LEVEL |
|---|---|---|---|
| Hi | Hi | SELECT GND | VOLTAGE LEVEL a FOR WHITE |
| Hi | Lo | SELECT PIXEL VOLTAGE | VOLTAGE LEVEL b FOR BLACK |
| Lo | Hi | SELECT PIXEL VOLTAGE | VOLTAGE LEVEL c FOR WHITE |
| Lo | Lo | SELECT GND | VOLTAGE LEVEL d FOR BLACK |
FIG. 18C

IMAGE PROJECTION APPARATUS, ITS CONTROL METHOD, AND STORAGE MEDIUM

BACKGROUND OF THE INVENTION

Field of the Invention

The present invention relates to an image projection apparatus, such as a liquid crystal projector.

Description of the Related Art

Projectors that receive a plurality of color lights (lights having different wavelengths such as red light, green light, and blue light) through a single light modulation element in a time division manner and project a color image have a problem of a so-called color break phenomenon. The color break is a phenomenon that causes a viewer facing a projected image to visually recognize red, green, and blue rather than white when he laterally shakes his head while the red light, the green light, and the blue light are being projected for each ⅓ frame in one frame in expressing white.

Such a color break occurs not only when a color image is projected in the above time division system, but also when each liquid crystal panel is driven by the pulse width modulation method (digital driving method) in expressing the gradation of each color using three liquid crystal panels for the red light, the green light, and the blue light. The pulse width modulation method divides one frame into a plurality of sub frames, and selects one of an application and a non-application of the ON voltage to a pixel in the liquid crystal panel for each sub frame, thereby controlling the ON time (ON duty cycle) of the pixel in one frame and expressing the gradation. In this pulse width modulation method, when the ON periods for applying the ON voltage shift from one another in the corresponding pixels in the three liquid crystal panels, three color lights are sequentially projected in one frame and the color break may occur. The generation principle of the color break in the pulse width modulation method will be described in detail later.

It is demanded to suppress the color break in the pulse width modulation method by controlling the voltage applied to the liquid crystal panel. As a method of controlling the voltage applied to the liquid crystal panel, Japanese Patent No. ("JP") 4909665 discloses a method of controlling a common voltage applied to a common electrode to liquid crystal panels so as to minimize a luminance difference (flicker) between frames of projected images. JP 4998573 discloses a method of controlling a common voltage according to a change in illumination light for illuminating a liquid crystal panel.

However, JPs 4909665 and 4998573 do not disclose a method for suppressing the color break in the pulse width modulation method.

SUMMARY OF THE INVENTION

The present invention provides an image projection apparatus configured to suppress a color break in driving a light modulation element in a pulse width modulation method.

An image projection apparatus according to one aspect of the present invention includes a plurality of light modulation elements each including a plurality of pixels, and configured to modulate lights having wavelengths different from each other, and a driver configured to generate a first voltage commonly applied to the plurality of pixels in each of the plurality of light modulation elements, and a second voltage configured to determine a maximum value of a ratio of a light amount of exit light to a light amount of incident light of the plurality of pixels, and to drive the plurality of light modulation elements through a pulse width modulation of the second voltage for each pixel according to an input image signal. The driver sets the second voltage to at least one light modulation element among the plurality of light modulation elements, which is different from that of another light modulation element and drives the plurality of light modulation elements. A control method of the image projection apparatus and a storage medium storing a program that enables a computer to execute the control method also constitute another aspect of the present invention.

An image projection apparatus according to another aspect of the present invention includes a light modulation element having a plurality of pixels and configured to modulate light, and a driver configured to generate a first voltage commonly applied to the plurality of pixels in each of the plurality of light modulation elements, and a second voltage configured to determine a maximum value of a ratio of a light amount of exit light to a light amount of incident light of the plurality of pixels, and to drive the plurality of light modulation elements through a pulse width modulation of the second voltage for each pixel according to an input image signal. The driver sets the second voltage to a pixel corresponding to light having a first wavelength among the plurality of pixels and, which is different from that of a pixel corresponding to light having a wavelength different from the first wavelength.

Further features of the present invention will become apparent from the following description of exemplary embodiments with reference to the attached drawings.

BRIEF DESCRIPTION OF THE DRAWINGS

FIGS. 18A-18C illustrate white and black expressions by the voltages applied to the liquid crystal pixel.

DESCRIPTION OF THE EMBODIMENTS

Referring now to the accompanying drawings, a description will be given of embodiments according to the present invention.

First Embodiment

Figure 1:
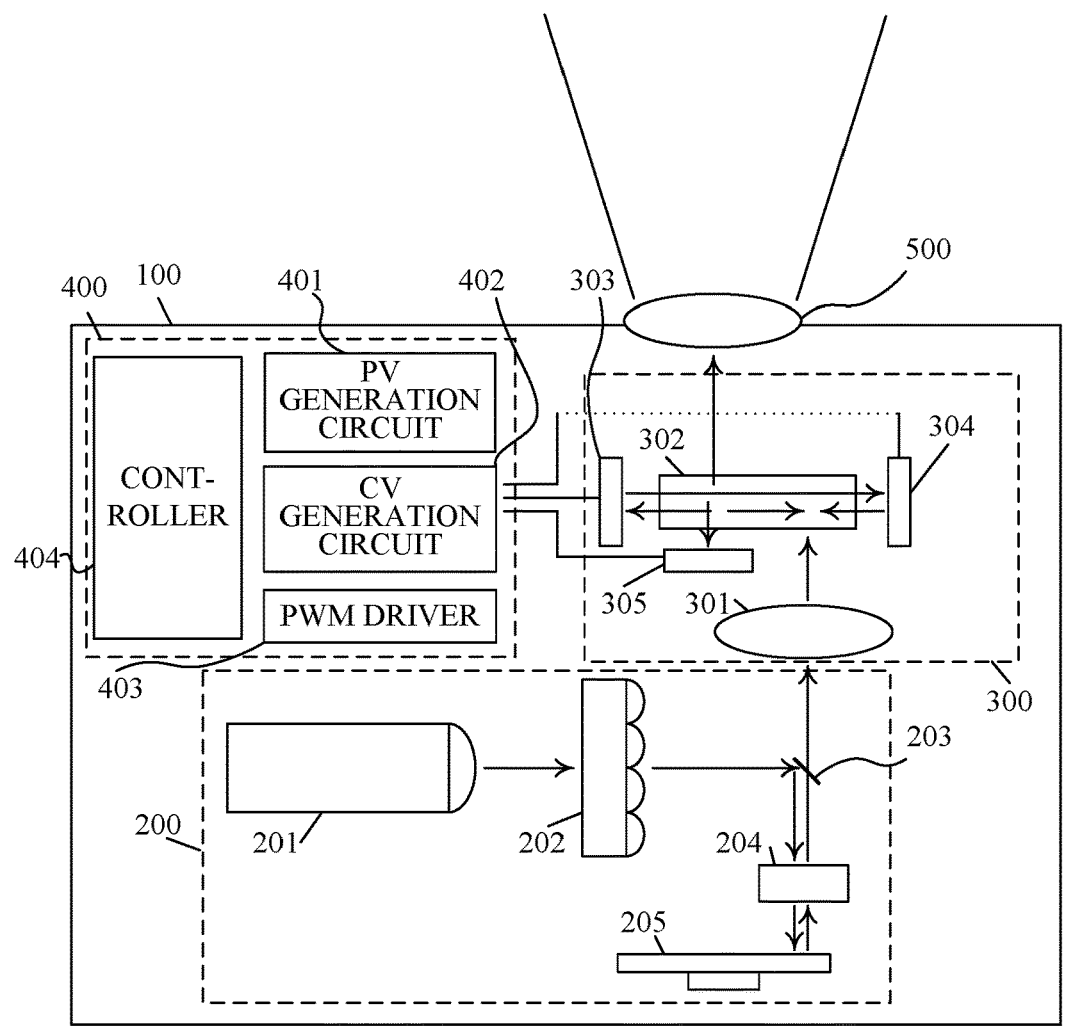
FIG. 1 illustrates a configuration of a liquid crystal projector according to a first embodiment of the present invention.

FIG. 1 illustrates a configuration of a liquid crystal projector 100 as an image projection apparatus according to a first embodiment of the present invention. The projector 100 includes a light source unit 200, an optical unit 300, a liquid crystal panel driver 400, and a projection lens 500.

The light source unit 200 includes a solid-state light source unit 201, a fly-eye lens 202, a dichroic mirror 203, a condenser lens 204, and a fluorescent body unit 205.

Figure 2:
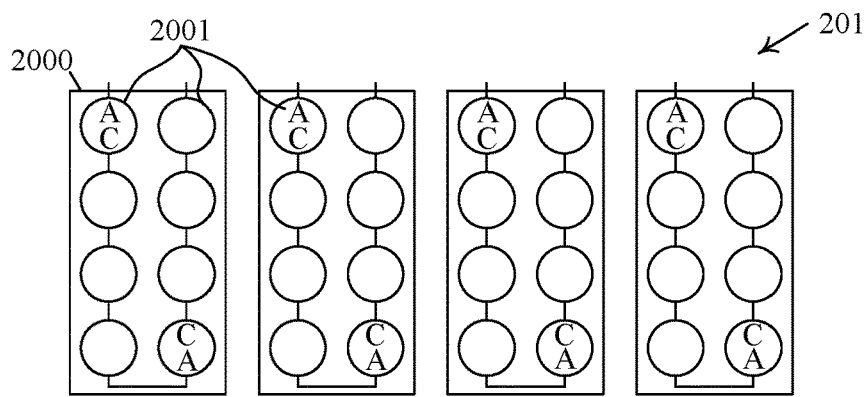
FIG. 2 illustrates a configuration of a light source unit in the projector according to the first embodiment.

The solid-state light source unit 201 has a plurality of solid-state light sources 2001 such as laser diodes or LEDs each configured to emit blue light as illustrated in FIG. 2 viewed from the light emitting direction. The solid-state light source unit 201 illustrated in FIG. 2 includes four sets of solid-state light source subunits 2000 each including eight solid-state light sources 2001. The eight solid-state light sources 2001 in each solid-state light source subunit 2000 are connected in series. In other words, an anode terminal A of the downstream solid-state light source 2001 is connected to a cathode terminal C of the upstream solid-state light source 2001. As the predetermined voltage and current are applied from an unillustrated light source drive circuit to the anode terminal A of the most upstream solid-state light source 2001, each solid-state light source 2001 emits light. The solid-state light source unit 201 emits the blue light as linearly polarized light.

The fly-eye lens 202 is an integrator optical system, and makes uniform the light intensity distribution when light incident from the solid-state light source unit 201 is condensed on a fluorescent body 2052 described later. The dichroic mirror 203 reflects the blue light from the fly-eye lens 202 and guides it to the condenser lens 204. The blue light condensed by the condenser lens 204 is irradiated onto the fluorescent body unit 205.

Figure 3:
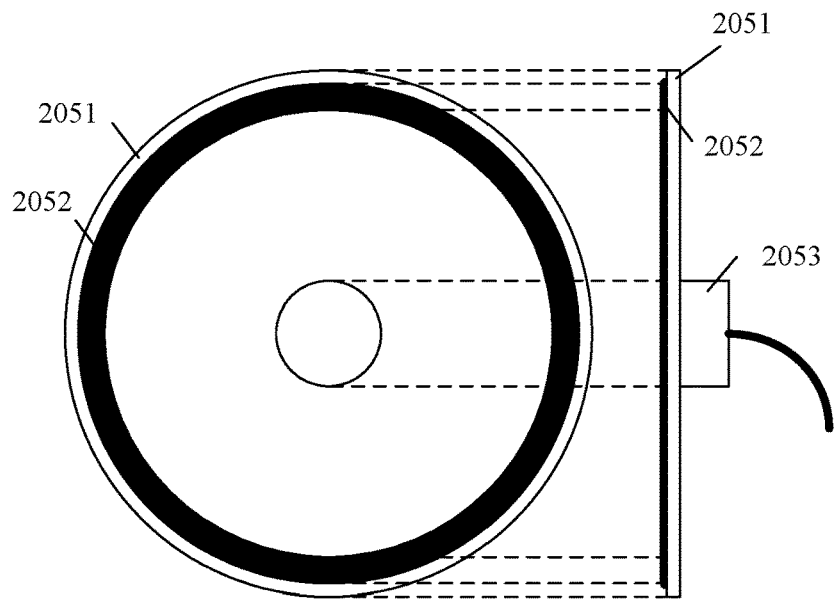
FIG. 3 illustrates a configuration of a fluorescent body unit in the projector according to the first embodiment.

As illustrated in FIG. 3, the fluorescent body unit 205 includes a specular disc 2051, the fluorescent body 2052, and a motor 2053. FIG. 3 illustrates a front view of the fluorescent body unit 205 in the light incident/emitting direction) on the left side, and a side view of the fluorescent body unit 205 on the right side. The specular disc 2051 is made of a lightweight metal such as aluminum. The front surface of the specular disc 2051 has a mirror surface that reflects light with a high reflectance. The fluorescent body 2052 is applied in a ring shape on the mirror surface. The fluorescent body 2052 wavelength-converts part of the incident blue light (excitation light) into yellow light (fluorescent light), and emits white light as combined light of the yellow light and the blue light (unconverted light) that is reflected by the specular disc 2051 without being wavelength-converted into the yellow light. The motor 2053 rotates the specular disc 2051 coated with the fluorescent body 2052 to prevent the excitation light from entering only part of the fluorescent body 2052 and thereby the wavelength conversion efficiency of the fluorescent body 2052 from lowering.

In FIG. 1, the white light emitted from the fluorescent body unit 205 is condensed by the condensing lens 204. Then, most of the yellow light component in the white light passes around the dichroic mirror 203, and part of the yellow light component passes through the dichroic mirror 203 and travels to the optical unit 300. In addition, most of the blue light component in the white light passes around the dichroic mirror 203 and travels to the optical unit 300, and part is reflected by the dichroic mirror 203. Although this reflected blue light component is not used for the image projection, it is a small light amount and therefore does not affect the luminance and the tint of the white light.

The optical unit 300 includes an afocal lens 301, a color separation and combination optical system 302, a light modulation element for red (referred to as an R panel hereinafter) 303, a light modulation element for green (referred to as a G panel hereinafter) 304, and a light modulation element for blue (referred to as a B panel hereinafter) 305. The white light that has entered the optical unit 300 is relayed by the afocal lens 301 and enters the color separation and combination optical system 302. The optical action of the color separation and combination optical system 302 will be described with reference to FIG. 4.

The color separation and combination optical system 302 includes a dichroic mirror 501, two polarization beam splitters 502 and 503, and a color combination (dichroic) prism 504. The R panel 303, the G panel 304, and the B panel 305 are all reflection type liquid crystal panels having a plurality of pixels, and are driven by the normally black method and the pulse width modulation (PWM) method. Alternatively, this embodiment and other embodiments described later may use a transmission type liquid crystal panel or another light modulation element.

Figure 4:
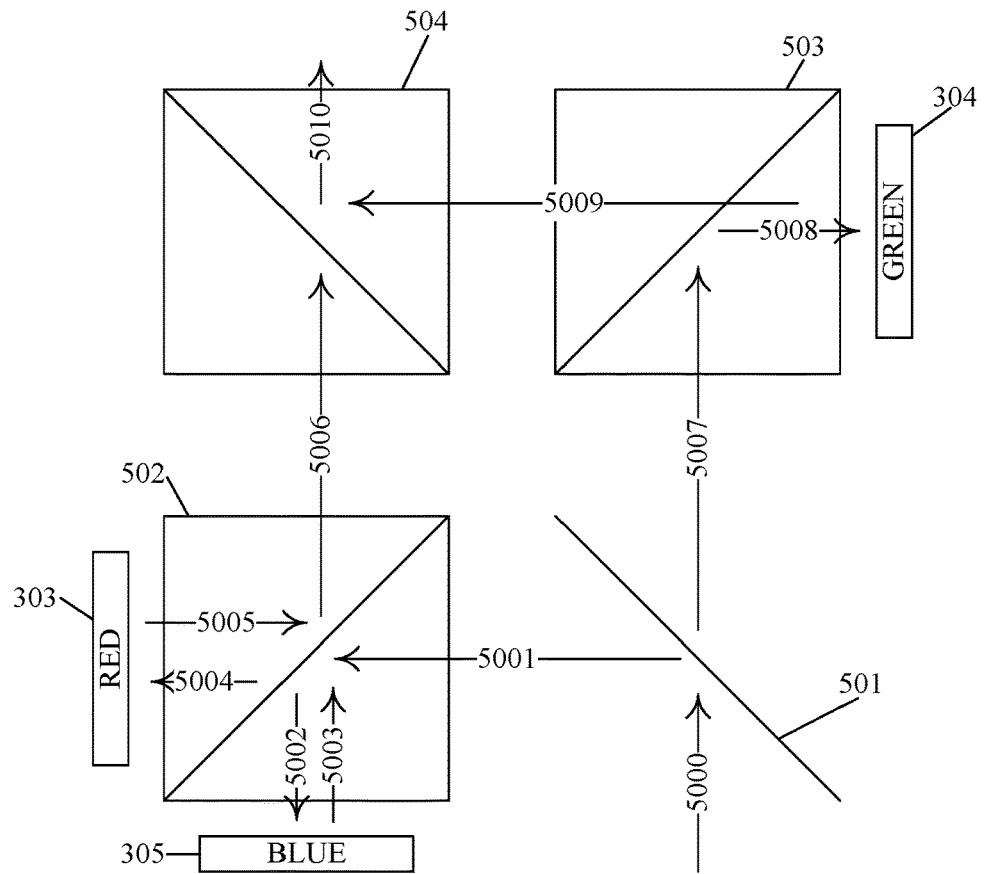
FIG. 4 illustrates the configuration of a color separation and combination optical system in the projector according to the first embodiment.

Arrows 5000 to 5010 in FIG. 4 denote lights. A green light component (referred to as G light hereinafter) 5007 in the white light 5000 from the afocal lens 301 is transmitted through the dichroic mirror 501 and enters the polarization beam splitter 503. Magenta light 5001 that includes a red light component (referred to as R light hereinafter) and a blue light component (referred to as B light hereinafter) in the light 5000 is reflected by the dichroic mirror 501 and enters the polarization beam splitter 502. The G light and the B light are linearly polarized light (such as the S-polarized light) when entering each polarization beam splitter, and the R light is linearly polarized light having a polarization direction orthogonal to the polarization directions of the G light and the B light (such as the P-polarized light).

The polarization beam splitter 502 reflects the B light as the S-polarized light. The reflected B light 5002 enters the B panel 305. B image light 5003 modulated by the B panel 305 into the P-polarized light passes through the polarization beam splitter 502. The polarization beam splitter 502 transmits the R light as P-polarized light. The transmitted R light 5004 enters the R panel 303. R image light 5005 modulated by the R panel 303 into the S-polarized light is reflected by the polarization beam splitter 502. The magenta image light 5006 thus combined by the polarization beam splitter 502 enters the color combination prism 504.

On the other hand, the polarization beam splitter 503 reflects G light as S-polarization. The reflected G light 5008 enters the G panel 304. G image light 5009 modulated by the G panel 304 into the P-polarized light passes through the polarization beam splitter 503 and enters the color combination prism 504.

The color combination prism 504 transmits the incident magenta image light 5006 and reflects the G image light 5009 to combine them with each other and guides RGB image light 5010 to the projection lens 500. The projection lens 500 enlarges and projects the RGB image light 5010 onto a projection surface such as an unillustrated screen. Thereby, a projection image is displayed as an RGB image.

The liquid crystal driver 400 includes a pixel voltage (PV) generation circuit 401, a common electrode voltage (CV) generation circuit 402, a pulse width modulation (PWM) driver 403, and a controller 404. The pixel voltage generation circuit 401 is a circuit that generates a pixel voltage (second voltage) as a power supply voltage applied to pixel electrodes in the R, G, and B panels 303, 304, and 305, and includes an electrical component, such as a DC/DC converter, a regulator IC, and a transistor. The conventional pixel voltage generation circuit outputs a constant voltage as the pixel voltage, but the pixel voltage generation circuit 401 according to this embodiment has a configuration capable of changing the output pixel voltage. For example, the pixel voltage is variable by using a programmable power supply IC for the pixel voltage generation circuit 401 or by using a variable resistor for the feedback resistance of the DC/DC converter. The configuration of the pixel voltage generation circuit 401 may be any configuration as long as the pixel voltage is variable. This embodiment will be described with the programmable power supply IC.

Figure 5:
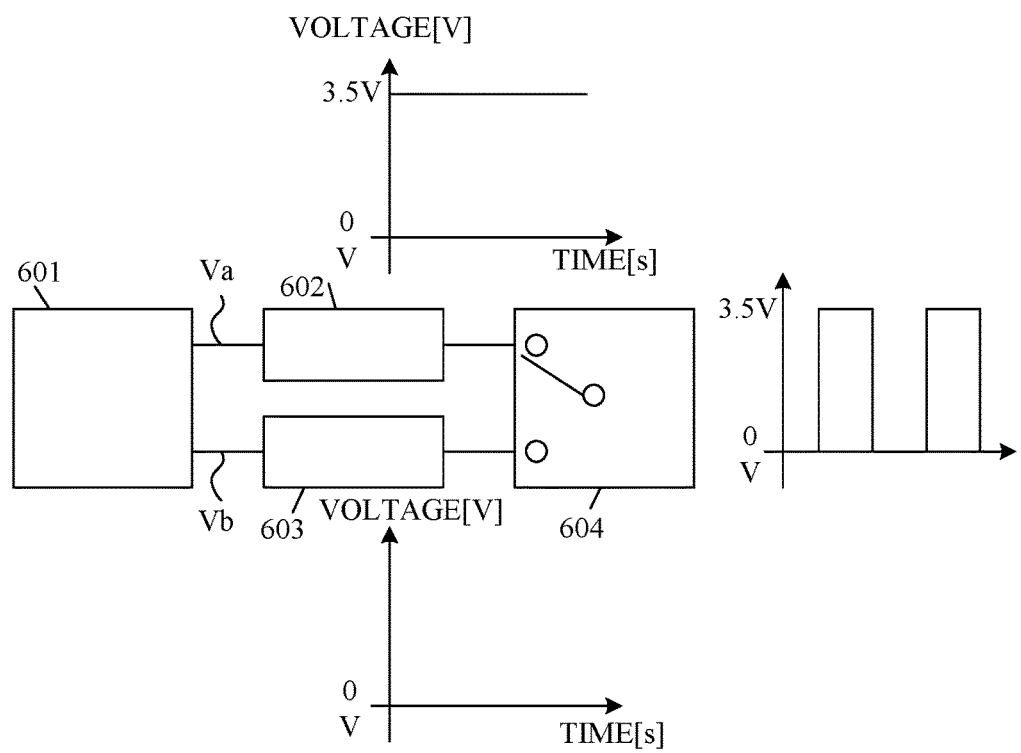
FIG. 5 illustrates the configuration of a common electrode voltage generation circuit in the projector according to the first embodiment.

The common electrode voltage generation circuit 402 generates a common electrode voltage (first voltage) as a rectangular wave as shown on the right side of FIG. 5. The common electrode voltage generation circuit 402 includes a D/A converter 601, operational amplifiers 602 and 603, and a switch IC 604. The D/A converter 601 converts a digital output value from the controller 404, and outputs two predetermined different voltages Va and Vb. Va and Vb are variable by controlling the digital output value from the controller 404, and have a relationship of Va>Vb. As illustrated in the upper and lower views, the operational amplifier 602 amplifies the predetermined voltage Va and outputs, for example, 3.5 V (High (Hi) of the common electrode voltage), and the operational amplifier 603 outputs, for example, 0 V (Low (Lo) of the common electrode voltage). These DC voltages are input to the switch IC 604, and the outputs of 3.5 V and 0 V are alternately selected in a predetermined cycle (such as 30 KHz) by the selection signal separately input to the switch IC 604, and the common electrode voltage as a rectangular wave is output.

Assume that Va is selected when the selection signal is Hi, and Vb is selected when the selection signal is Lo in this embodiment. The voltages Hi and Lo of the common electrode voltage are variable by controlling a digital value output from the driver 400 to the D/A converter 601. Although the D/A converter 601 and the operational amplifiers 602 and 603 are used, a programmable power supply IC or the like may be used as in the pixel voltage generation circuit 401.

Referring now to FIGS. 18A to 18C, a description will be given of white (ON) and black (OFF) expressions by the voltage applied to the liquid crystal pixel. FIG. 18A illustrates a liquid crystal pixel and its peripheral circuit. The liquid crystal pixel is sandwiched between the common electrode and the pixel electrode. The output of the common electrode voltage generation circuit 402 is connected to the common electrode, and the output from the pixel voltage generation circuit 401 or GND is alternately selected and connected to the pixel electrode by SW. This selection is made by an output of an XOR circuit. The selection signal for selecting Va or Vb of the common electrode voltage generation circuit 402 and an image output (PWM pattern described later) are input to the XOR circuit.

FIG. 18B illustrates the relationship between the pixel voltage and the common electrode voltage, and FIG. 18C illustrates a truth table of signals input to the XOR circuit. In the truth table in FIG. 18C, when the selection signal is Hi and the image signal is Hi, the SW of the pixel electrode selects the connection with GND. At this time, the common electrode side has a voltage of Hi, the pixel electrode side has a voltage of GND, and the voltage (potential difference) "a" illustrated in FIG. 18B is applied to the liquid crystal pixel. Since the voltage "a" increases the potential difference between both ends of the liquid crystal pixel, the liquid crystal pixel has a white display state (ON state, a state in which illumination light enters the color combination prism 504). Next, when the selection signal is Hi and the image signal is Lo, the SW of the pixel electrode selects the connection with the pixel voltage side. At this time, the voltage on the common electrode side is the voltage Hi, the voltage on the pixel electrode side is the voltage of the pixel voltage, and the voltage "b" illustrated in FIG. 18B is applied to the liquid crystal pixel. Since the voltage "b" reduces the potential difference ΔV between both ends of the liquid crystal pixel, the liquid crystal pixel has a black display state (OFF state, a state in which illumination light does not enter the color combing prism 504). The common electrode voltage Hi and the pixel voltage are set such that the potential difference ΔV provides the black display (OFF state) due to the characteristic of the optical unit 300 and the like.

Next, when the selection signal is Lo and the image signal is Hi, the SW of the pixel electrode selects the connection with the pixel electrode side. At this time, the voltage on the common electrode side is the voltage Lo, the voltage on the pixel electrode side is the voltage of the pixel voltage, and the voltage "c" indicated in FIG. 18B is applied to the liquid crystal pixel. Since the voltage "c" increases the potential difference between both ends of the liquid crystal pixel, the liquid crystal pixel has a white display state (ON state).

When the selection signal is Lo and the image signal is Lo, the SW of the pixel electrode selects the connection with GND. At this time, the voltage Lo is applied to the common electrode side, the voltage GND is applied to the pixel electrode side, and the voltage "d" in FIG. 18B is applied to the liquid crystal pixel. Since this voltage "d" reduces the potential difference ΔV between both ends of the liquid crystal pixel, the liquid crystal pixel has the black display state (OFF state). The common electrode voltage Lo is set such that the potential difference ΔV provides the black display (OFF state) due to the characteristic of the optical unit 300 and the like is obtained.

As described above, the white display or black display is available by selecting the voltage applied to the pixel electrode according to switching the common electrode voltage at a predetermined cycle.

Figure 10:
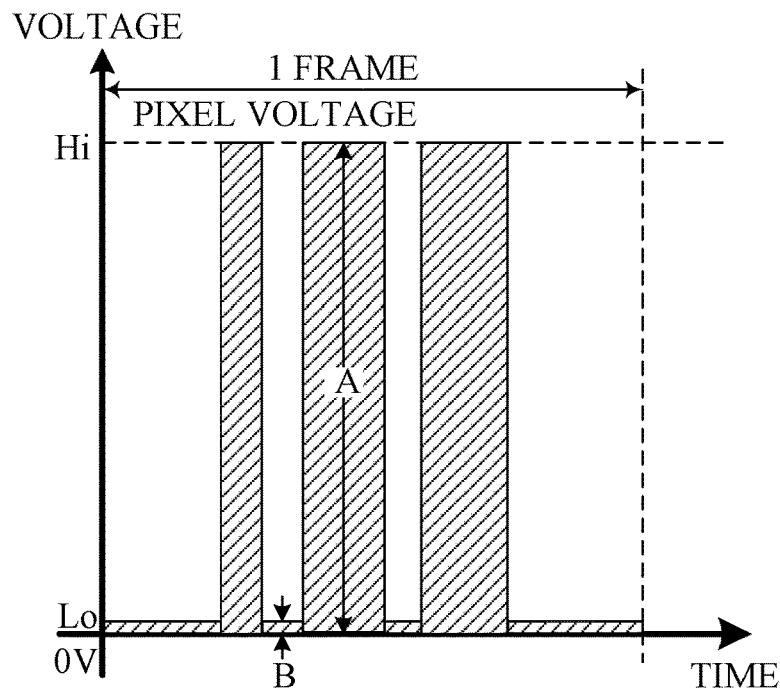
FIG. 10 illustrates a common electrode voltage and a pixel voltage.

Referring now to FIG. 10, a description will be given of the relationship between the common electrode voltage and the pixel voltage. FIG. 10 illustrates, as an example, the relationship between the pixel voltage and the common electrode voltage Lo.

As described with reference to FIG. 18B, for a segment "A" in FIG. 10, the common electrode voltage is Lo, the pixel voltage is ON (=Hi>Lo), and a potential difference Hi-Lo as a difference occurs in the liquid crystal pixel. At this time, the pixel has the white display state. For a segment "B" in FIG. 10, since the common electrode voltage is Lo and the pixel voltage is OFF (GND=0V), only a potential difference Lo (ΔV in FIG. 18B) occurs in the pixels of the liquid crystal panel. At this time, the pixel has the black display state.

Hence, the pixels in the liquid crystal panel express the gradation by the occupancy ratio (ON duty cycle) of the ON time in which the pixel voltage is applied in one frame period. The pixel voltage is determined by the power supply voltage of the pulse width modulation driver 403. The common electrode voltage and the pixel voltage can be arbitrarily set.

Figure 6:
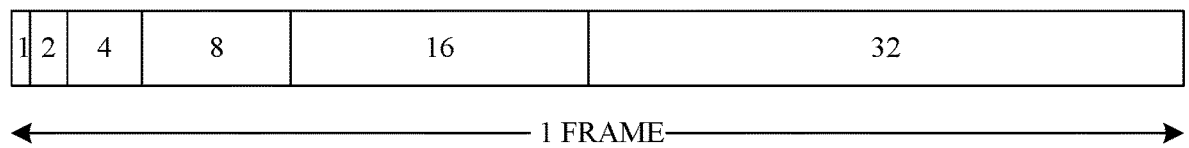
FIG. 6 illustrates weighting in one frame in a pulse width modulation (PWM) drive of the liquid crystal panel in the projector according to the first embodiment.

The pulse width modulation circuit 403 performs the pulse width modulation for the pixel voltage in accordance with the gradation of the image signal input to the projector 100. The pulse width modulation will be described with reference to FIGS. 6 and 7. FIG. 6 illustrates an example that divides one frame period of an image to be projected into a plurality of subframe periods (bit lengths). A numerical value described in each subframe period indicates a time weight in one frame period of that subframe. In an example, a case of expressing 64 gradations is shown. A subframe period in which the pixel voltage is applied (turned on) to the pixel will be referred to as an ON period, and a subframe period in which the pixel voltage is not applied to the pixel (turned off or applies an OFF voltage) will be referred to as an OFF period.

Figure 7:
FIG. 7 illustrates an illustrative gradation expression by the PWM drive.

FIG. 7 illustrates a pulse width modulation pattern (referred to as a PWM pattern hereinafter) of the liquid crystal panel corresponding to the subframe division example illustrated in FIG. 6. The ordinate axis represents the gradation, and the abscissa axis represents one frame period. A white subframe period in FIG. 7 indicates the ON period in which the pixel has the white display state, and a black subframe period indicates the OFF period in which the pixel has the black display state. By driving each pixel of the liquid crystal panel according to this PWM pattern, 64 gradations can be expressed.

This embodiment drives all of the R, G, and B panels 303 to 305 using the same PWM pattern. The PWM patterns for the R, G, and B panels 303 to 305 may be slightly different (adjusted) in order to suppress the phenomenon affecting the image quality such as the disclination in each liquid crystal panel. Nevertheless, basically, the R, G, and B panels 303 to 305 are driven using the equally configured PWM patterns. The "same" PWM pattern means that the basic pattern configuration excluding the above adjustment part is the same.

Next follows a description of the color break that occurs in driving the R, G, and B liquid crystal panels through the pulse width modulation drive method. The projector 100 according to this embodiment enables the user to select an image projection mode to be used among a plurality of image projection modes. A description will now be given of an image projection mode in which no color break occurs. When white is displayed in the brightness priority mode as a first image projection mode that does not define the tint, no color break occurs. This will be described using FIGS. 8A and 8B.

Figures 8A, 8B:
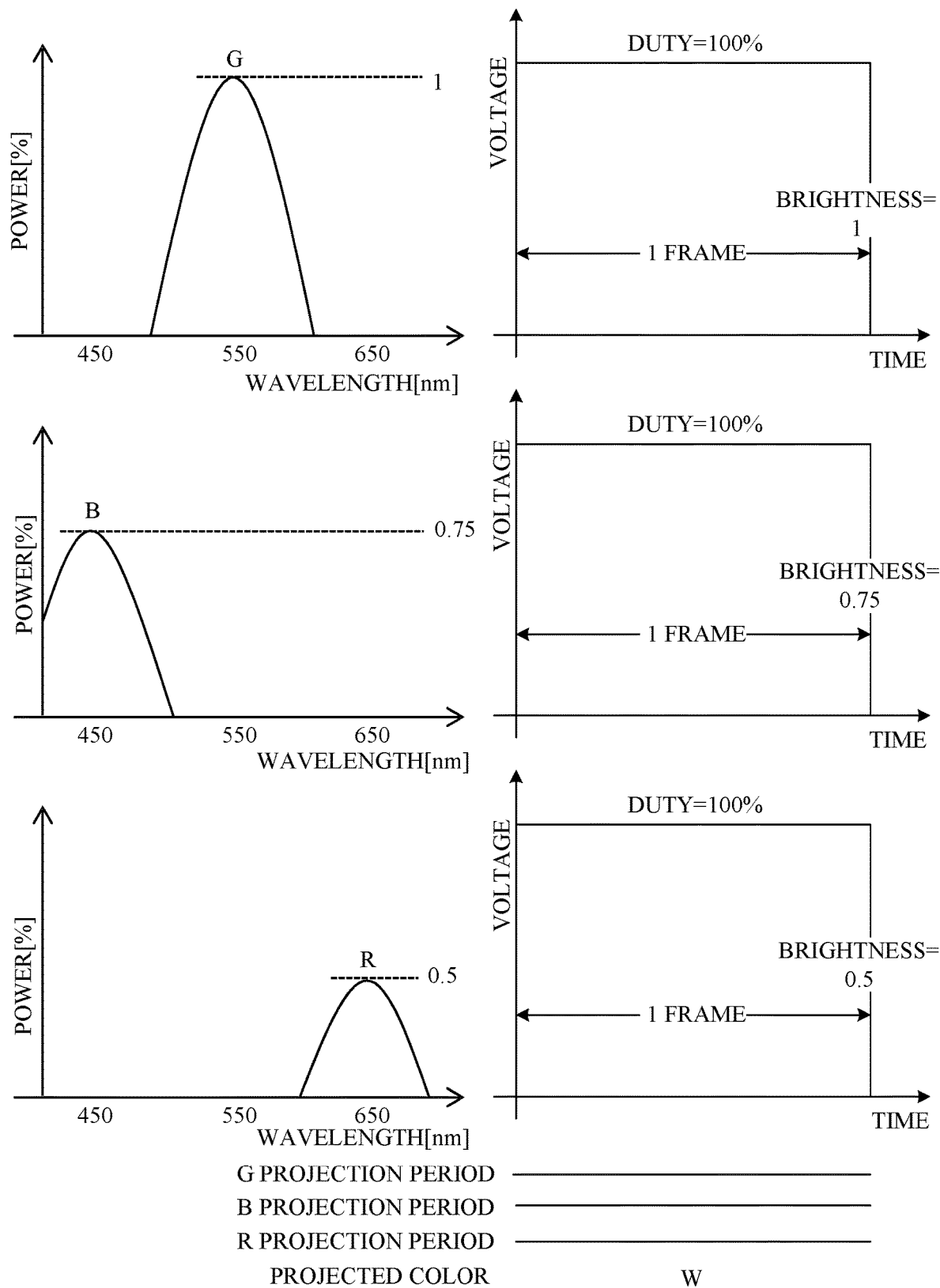
FIGS. 8A and 8B illustrate a relationship between a light amount and a pixel voltage in a presentation mode.

Views of three vertically arranged parabola on the left side in FIG. 8A illustrate a light amount of the G light, a light amount of the B light, and a light amount (brightness) of the R light incident on the R, G, and B liquid crystal panels from the fluorescent body 2052. Assume that the G light amount is set to 1. Then, the B light amount is 0.75, and the R light amount is 0.5. Views of three vertically arranged square waves on the right side in FIG. 8B indicate the duty cycles for the pixel voltages applied to the R, G, and B liquid crystal panels during one frame period (referred to as an ON duty cycle hereinafter). All of the R, G, and B liquid crystal panels have the ON duty cycles of 100%.

Since the light amounts of the G light, the B light, and the R light entering the R, G, and B liquid crystal panels are different from one another, the light amounts reflected by the R, G, and B liquid crystal panels are also different from each other and they have 1, 0.75, and 0.5. Since the ON duty cycles of the R, G, and B liquid crystal panels are all the same or the projection periods for the G light, the B light, and the R light on the projection surface illustrated in the lower part of FIGS. 8A and 8B are all the same, white light W is projected over the one frame period. Hence, the viewer of the projection image visually recognizes no color break.

On the other hand, when the second image projection mode that emphasizes the tint, for example, when the image quality priority mode (sRGB mode) is set, the light amount of the G light, the light amount of the B light, and the light amount of the R light are all the same. The color break occurs at this time. The generation principle of the color break will be described with reference to FIGS. 9A and 9B.

Figures 9A, 9B:
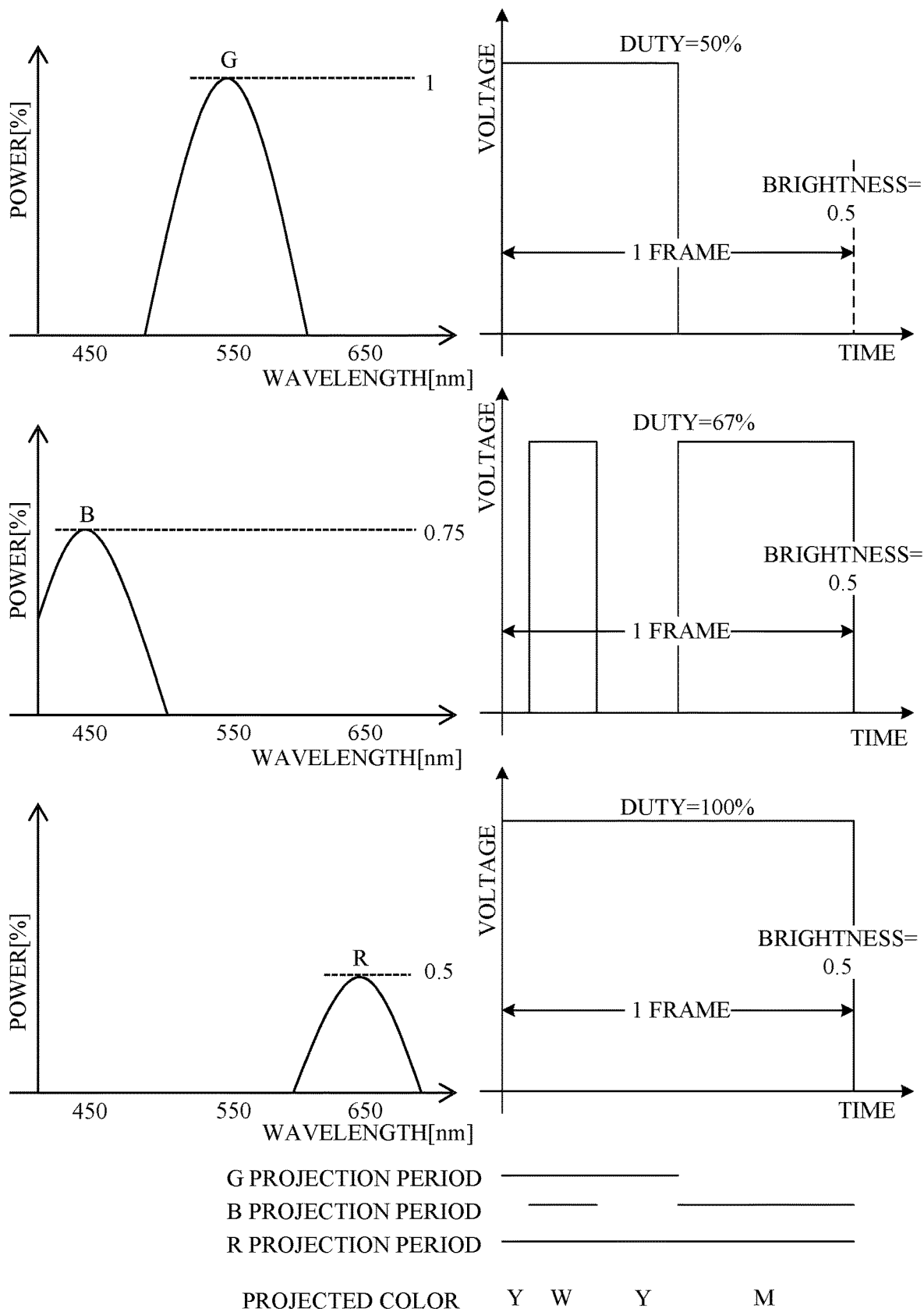
FIGS. 9A and 9B illustrate a relationship between the light amount and the pixel voltage in an sRGB mode.

Views of three vertically arranged parabola on the left side in FIG. 9A illustrate the light amount of the G light, the light amount of the B light, and the light amount (brightness) of the R light entering the R, G, and B liquid crystal panels from the fluorescent body 2052. Similar to FIGS. 8A and 8B, the light amount of the G light is 1, the light amount of the B light is 0.75, and the light amount of the R light is 0.5. Views of three vertically arranged square waves on the right side in FIG. 9B illustrate the ON duty cycles for the pixel voltage applied to the R, G, and B liquid crystal panels during one frame period. Since the R light amount is the smallest among the G light, the B light, and the R light from the fluorescent body 2052, it is necessary to reduce the ON duty cycles for the G and B liquid crystal panels so as to reduce the G and B light amounts to be reflected by these liquid crystal panels. More specifically, when the light amount of R light is set to 0.5 and the ON duty cycle for the liquid crystal panel for R is set to 100%, the ON duty cycle for the G liquid crystal panel which the G light having a light amount of 1 enters is set to 50%, and the ON duty cycle for the B liquid crystal panel which the B light with a light amount of 0.75 enters is set to 67%. Thereby, all of the light amounts of the G light, the B light, and the R light reflected by the R, G, and B liquid crystal panels can be maintained 0.5.

As illustrated in the lower part in FIGS. 9A and 9B, the ON periods reflected by the G and B liquid crystal panels which the G light and the B light are different from each other in one frame period by reducing the ON duty cycles for the G and B liquid crystal panels from 100% and by making them different from each other. As a result, there is a period in which only one of the G light and the B light is projected onto the projection surface. The white light W is projected during the period when all the G light, the B light, and the R light are reflected by the liquid crystal panel, but the yellow light Y is projected during the period when only the G light and the R light are reflected by the liquid crystal panels, and the magenta light M is projected during the period when only the B light and the R light are reflected by the liquid crystal panels. In this case, the viewer visually perceives white over the one frame period in viewing the projection surface from the front, but may perceive yellow and magenta if he shakes his head laterally or vertically. This embodiment attempts to suppress such color breaks.

The controller 404 includes a microcomputer, an ASIC, an FPGA, or the like, and controls the pixel voltage generation circuit 401, the common electrode voltage generation circuit 402, and the pulse width modulation driver 403. When the controller 404 detects the operation of the user through an unillustrated operation unit or a remote controller provided in the projector 100, the controller 404 powers on the projector 100 or changes (sets) the projection mode according to the operation. The pixel voltage generation circuit 401, the common electrode voltage generation circuit 402, and the pulse width modulation driver 403 are controlled according to the set projection mode.

Figure 11:
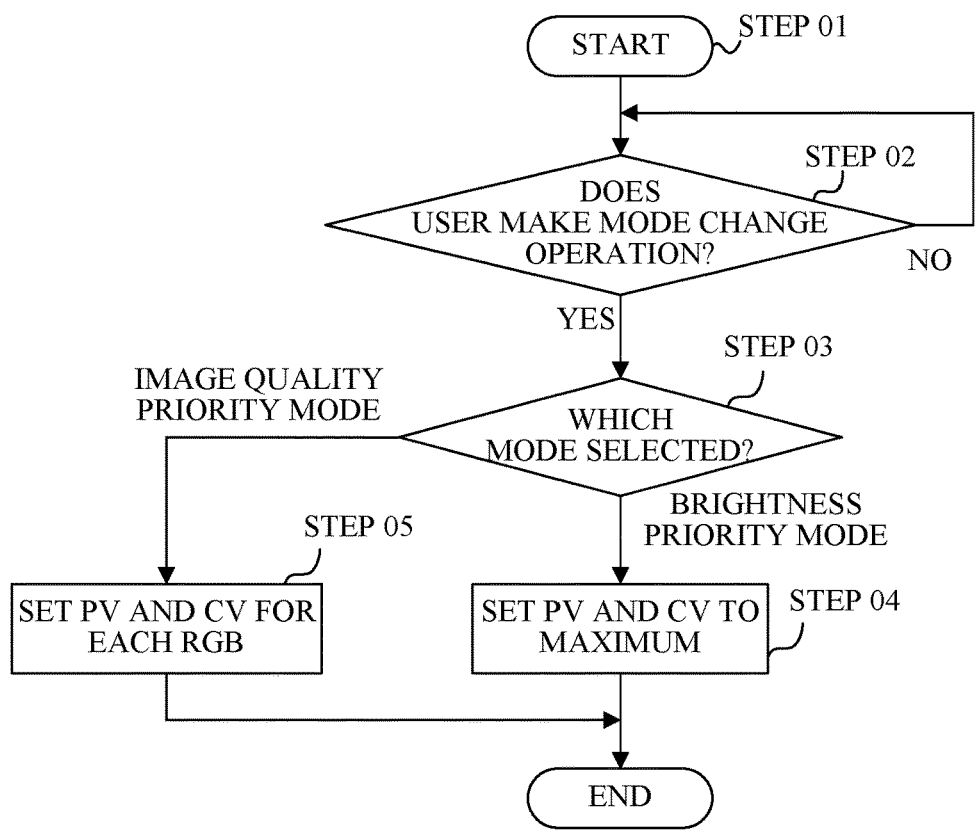
FIG. 11 is a flowchart illustrating processing performed by the projector according to the first embodiment.

Processing (or a control method) performed by the controller 404 will be described using a flowchart of FIG. 11. The controller 404 as a computer executes this processing according to a computer program. The solid-state light source 2001 is a blue laser diode, and the light amount ratio from the fluorescent body 2052 is R:G:B=0.5:0.75:1.

The controller 404 that detects the power ON operation in the operation unit or the remote controller described above powers on the projector 100 in the step 01.

Next, in the step 02, the controller 404 determines whether an operation to change the projection mode has been performed in the operation unit or the remote controller. If the operation to change the projection mode is not performed, the determination in the step 02 is performed again. When the operation to change the projection mode is performed, the controller 404 proceeds to the step 03.

In the step 03, the controller 404 determines which of the brightness priority mode and the image quality priority mode is selected by the operation of changing the projection mode. When the brightness priority mode is selected, the controller 404 proceeds to the step 04, and when the image quality priority mode is selected, the controller 404 proceeds to the step 05.

Figure 12A:
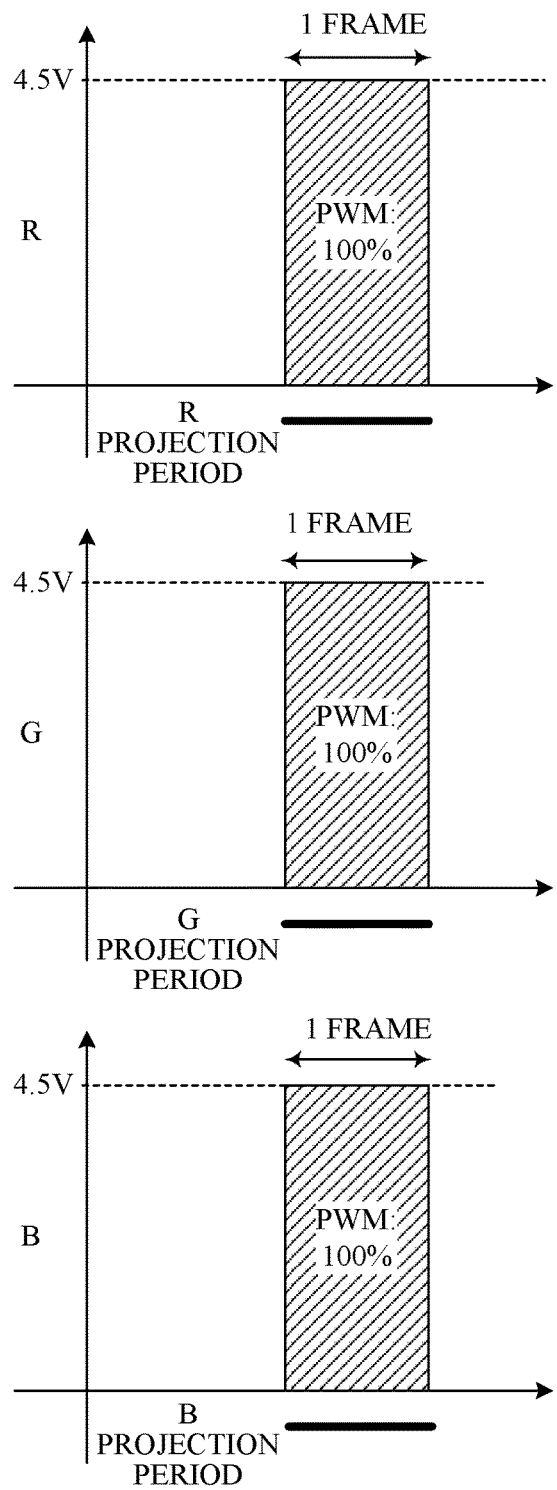
FIGS. 12A and 12B illustrate the PWM drives of the liquid crystal panel in the presentation mode and the sRGB mode in the first embodiment.

Referring now to FIG. 12A, a description will be given of white display processing in the step 04 when the brightness priority mode is selected. Three vertical views illustrated in FIG. 12A show voltages (referred to as a PWM in the figure) applied to the R, G, and B panels 303 to 305 in the brightness priority mode.

In the brightness priority mode, the controller 404 causes the programmable power supply IC of the pixel voltage generation circuit 401 to generate the pixel voltage of 4.5 V at maximum. The pixel voltage determines the maximum value of the reflectance on each of the R, G, and B panels 303 to 305 (referred to as a maximum reflectance hereinafter). When the R, G, and B panels 303 to 305 are transmission type liquid crystal panels, the pixel voltage determines the maximum value of the transmittance. This is similar to a case where digital micro mirror devices are used for the R, G, and B panels 303 to 305. The reflectance and the transmittance correspond to a ratio of a light amount of exit light to a light amount of incident light of the light modulation element.

The controller 404 causes the common electrode voltage generation circuit 402 to generate the common electrode voltage Hi of 4.5 V at maximum that is the same as the pixel voltage. The controller 404 causes the PWM driver 403 to set the ON duty cycles for the R, G, and B panels 303 to 305 to 100%. Thus, the brightness priority mode expresses white as the maximum gradation by setting the common electrode voltage Hi and the pixel voltage to 4.5 V and the ON duty cycles to 100% for all the R, G and B panels 303 to 305. The brightness ratio among the R light, the G light, and the B light at this time is R:G:B=0.5:0.75:1. The state that sets the pixel voltage, the common electrode voltage, and the ON duty cycle corresponds to a first setting state (first drive mode).

Figure 12B:
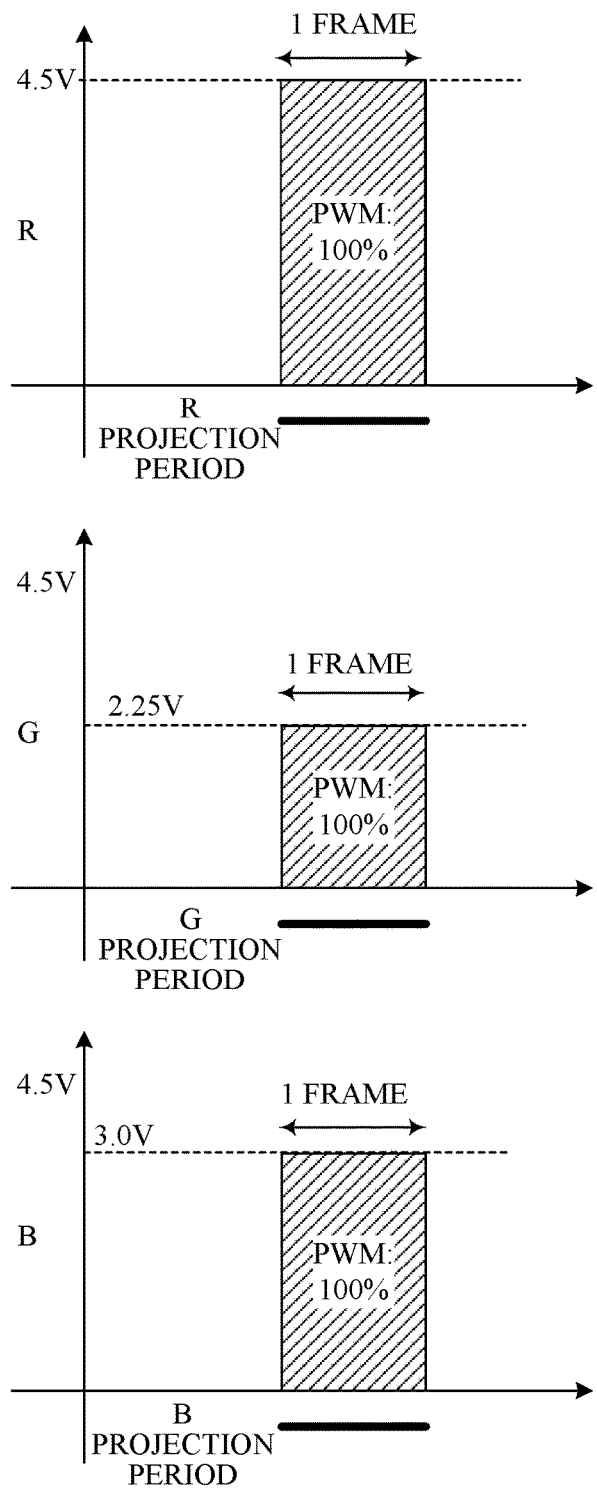

Referring now to FIG. 12B, a description will be given of the white display processing in the step 05 when the image quality priority mode is selected. Three vertical views illustrated in FIG. 12B show the voltages (PWM) applied to the R, G, and B panels 303 to 305 in the image quality priority mode.

As described above, the image quality priority mode requires the brightness of the projected R light, G light, and B light to be equal to one another. The controller 404 causes the pixel voltage generation circuit 401 to generate the pixel voltages for the R, G and B panels 303 to 305 as R: 4.5V, G: 2.25V, and B: 3.0V. The controller 404 causes the common electrode voltage generation circuit 402 to generate the common electrode voltages Hi as R: 4.5V, G: 2.25V, and B: 3.0V, which are the same as the pixel voltages. The controller 404 causes the pulse width modulation driver 403 to set the ON duty cycles to 100% for the R, G, and B panels 303 to 305. The state that set the pixel electrode, the common electrode voltage, and the ON duty cycle corresponds to a second setting state (second drive mode).

The maximum reflectance of each of the G and B panels 304 and 305 is made lower than the maximum reflectance of the R panel 303 by reducing the pixel voltages for the G and B panels 304 and 305 and the common electrode voltage Hi from 4.5V in this manner. Thereby, even when the ON duty cycles are set to 100% for the R, G and B panels 303 to 305 where the light amounts of the R light, the G light, and the B light entering the R, G, and B panels 303 to 305 are different from one another, white can be expressed by making equal the light amounts of the projected R light, G light, and B light to one another. Then, by setting all of the ON duty cycles to 100% for the R, G, and B panels 303 to 305, the R light, the G light, and the B light are projected without any interruptions over the one frame period and no color breaks occur.

As described above, this embodiment can make equal the light amounts of the projected R light, G light, and B light to one another without lowering the ON duty cycle of any one of the liquid crystal panels from 100% even if the light amounts of the R light, the G light, and the B light entering the R, G, and B panels 303 to 305 are different from one another. This configuration can suppress the color break while maintaining the image quality of the projected image required for the image quality priority mode.

This embodiment makes equal the common electrode voltage Hi and the pixel voltage to each other, but they may not be equal to each other. As described above, since the potential difference applied to the pixel (liquid crystal) is the difference between the common electrode voltage and the pixel voltage, Hi of the common electrode voltage as an absolute value may be higher than the pixel voltage. However, whether the mode is the brightness priority mode or the image quality priority mode, a difference between Hi of the common electrode voltage and the pixel voltage needs to be constant. The black level in the black display is determined not only by the difference between Hi of the common electrode voltage and the pixel voltage but also by the adjustment of the optical unit 300, but the optical unit 300 cannot be dynamically adjusted. As the difference changes, the black level changes according to the projection mode.

Figure 19A:
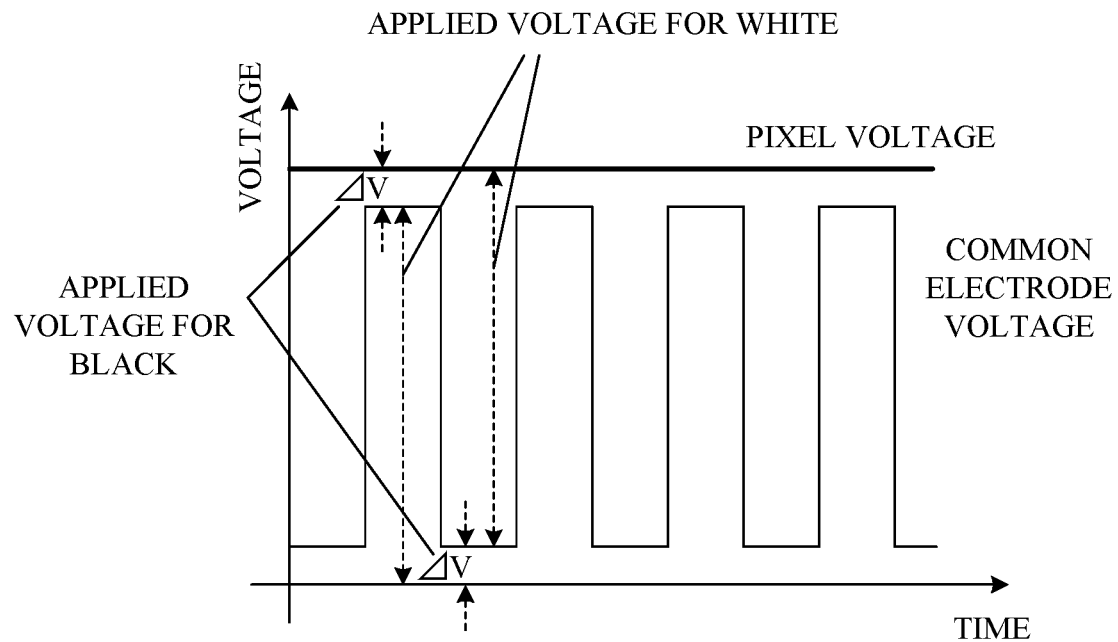
FIGS. 19A and 19B illustrate a variation of the first embodiment.
Figure 19B:
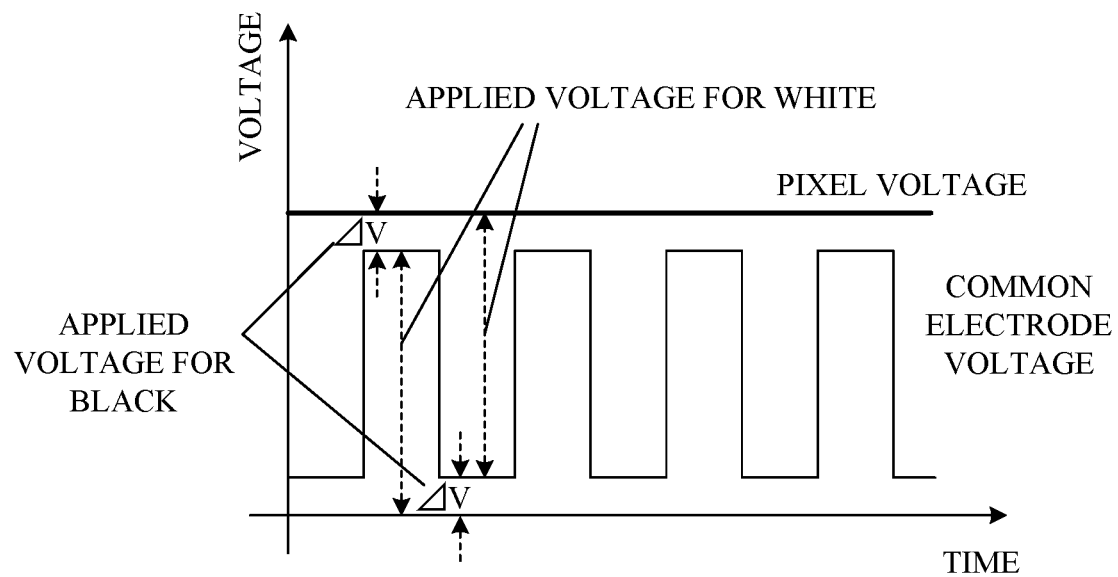

Thus, when the controller 40 causes the pixel voltage generation circuit 401 to change the pixel voltage according to the projection mode as illustrated in FIG. 19B, it causes the common electrode voltage generation circuit 402 to change the Hi of the common electrode voltage while maintaining the difference form the pixel voltage illustrated in FIG. 19A to be the predetermined pre-change value ΔV. In other words, the controller 404 can change the pixel voltage and the common electrode voltage Hi without changing the difference between them.

Second Embodiment

Figure 13:
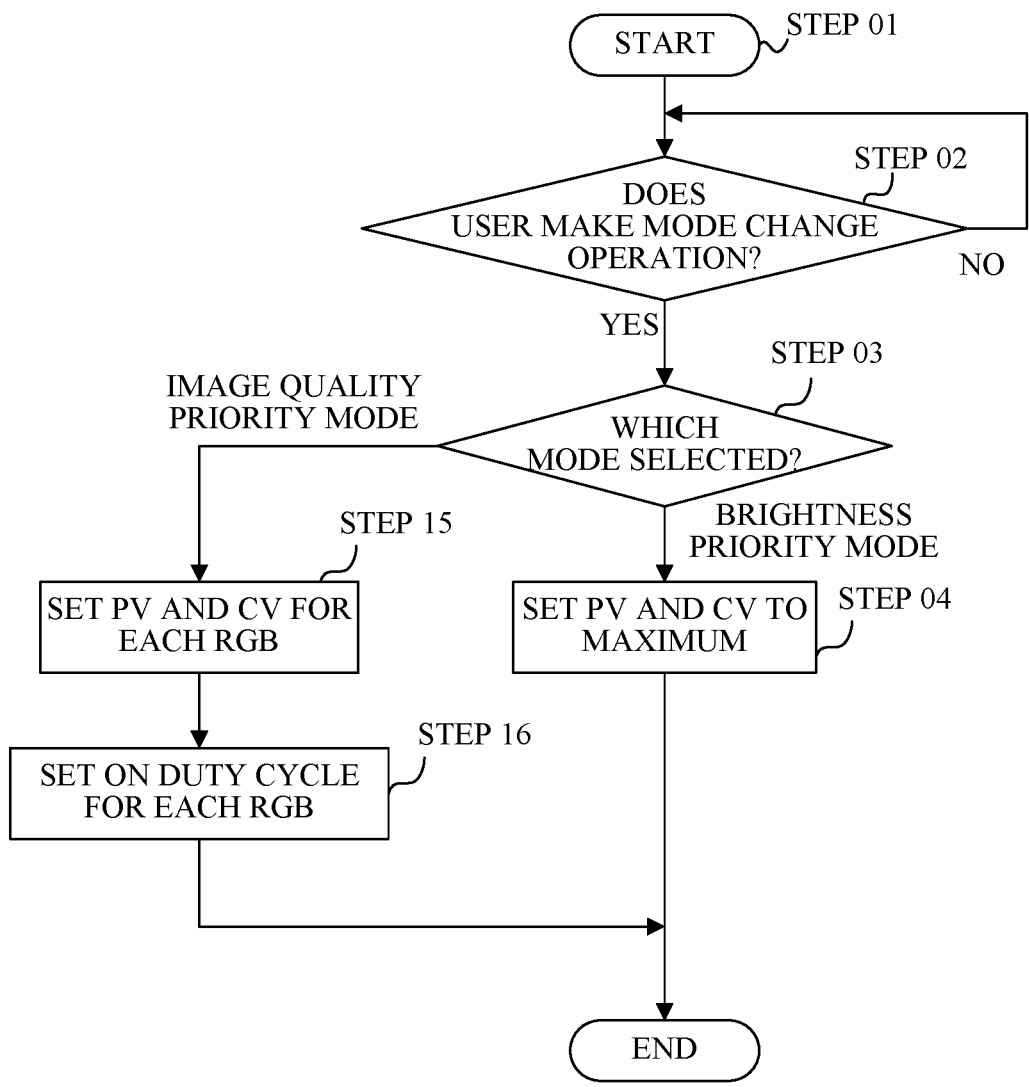
FIG. 13 is a flowchart showing processing performed by the projector according to a second embodiment.

Referring now to a flowchart illustrated in FIG. 13, a description will be given of processing performed by the controller 404 according to a second embodiment of the present invention. The configuration of the projector according to this embodiment is the same as that of the first embodiment (FIG. 1). Even in this embodiment, the solid-state light source 2001 is a blue laser diode, and the light amount ratio from the fluorescent body 2052 is R:G:B=0.5:0.75:1. Since the step 01 to the step 04 are the same as those in the first embodiment (FIG. 11), the description thereof will be omitted.

Figure 14:
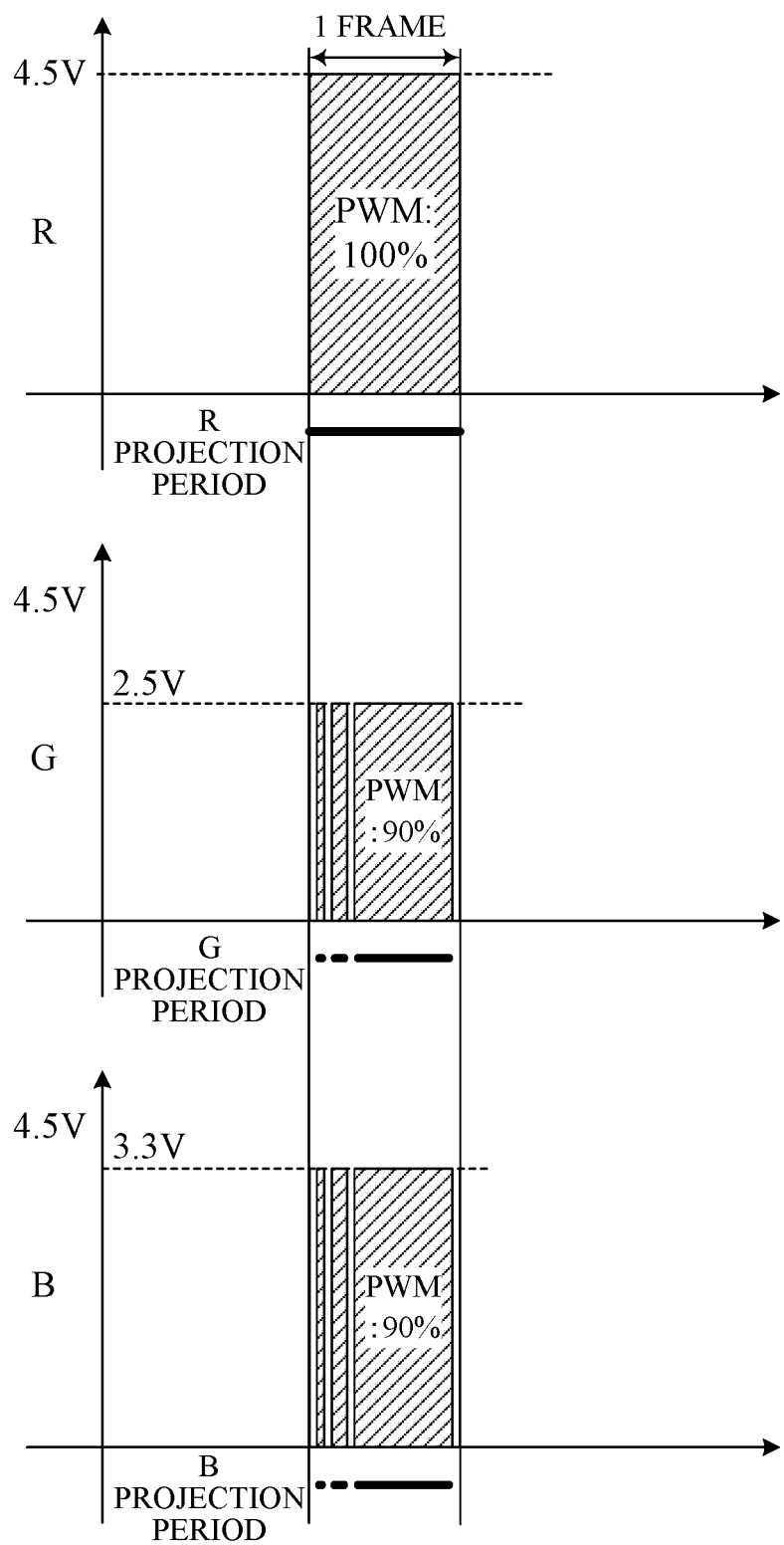
FIG. 14 illustrates the PWM drives of the liquid crystal panel in the presentation mode and the sRGB mode according to the second embodiment.

This embodiment performs processing of the steps 15 and 16, when the image quality priority mode is selected in the step 03, instead of the step 05 of the first embodiment. The white display processing in the steps 15 and 16 will be described with reference to FIG. 14. Three vertical views illustrated in FIG. 14 show voltages (PWM) applied to the R, G, and B panels 303 to 305 in the image quality priority mode.

In the step 15, the controller 404 causes the pixel voltage generation circuit 401 to generate R: 4.5 V, G: 2.5 V, and B: 3.3 V as pixel voltages of the R, G, and B panels 303 to 305. The pixel voltages of the G and B panels 304 and 305 are higher than those of the first embodiment. The controller 404 causes the common electrode voltage generation circuit 402 to generate R: 4.5 V, G: 2.5 V, and B: 3.3 V, which are the same as the pixel voltage and Hi of common electrode voltage.

In the step 16, the controller 404 causes the pulse width modulation driver 403 to set the ON duty cycle to 100% for the R panel 303, and sets the ON duty cycles to 90% for the G and B panels 304 and 305. In other words, the ON duty cycles for the G and B panels 304 and 305 are set lower than the ON duty cycle for the R panel 303.

In this setting state (second setting state), there is a period during which the R light is projected but the G light and the B light are not projected within one frame period, but the period when the G light and the B light are not projected is too short for the viewer to visually recognize. Therefore, the color break can be substantially suppressed.

In the setting illustrated in FIG. 14, in the R panel 303, the incident R light amount is set to 0.5, the pixel voltage is set to 4.5 V, the ON duty cycle is set to 100%, and the reflected R light amount is set to 0.5. In the G panel 304, the incident G light amount is set to 1, the pixel voltage is set to 2.5 V, the ON duty cycle is set to 90%, and the reflected G light amount is set to 0.5. In the B panel 305, the incident B light amount is set to 0.75, the pixel voltage is set to 3.3 V, the ON duty cycle is set to 90%, and the reflected B light amount is set to 0.5. In other words, white can be expressed by making equal the light amounts of the projected R light, G light, and B light to one another.

As described above, even if the ON duty cycles for the R, G, and B panels 303 to 305 are not equal to one another, the difference among the ON duty cycles may limited to a range where no color break is visually recognized by the viewer.

Third Embodiment

Figure 15:
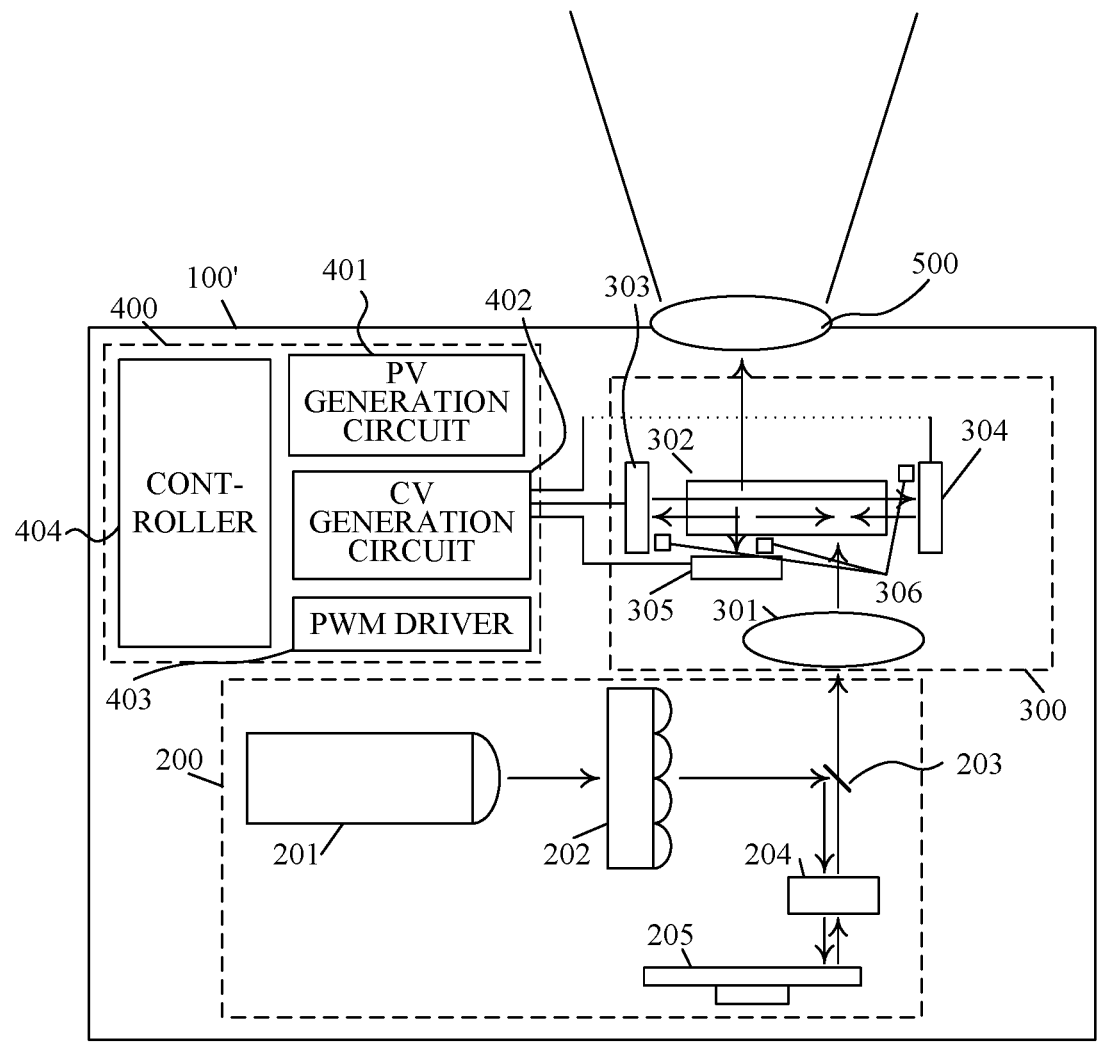
FIG. 15 illustrates a configuration of a projector according to a third embodiment.

FIG. 15 illustrates a configuration of a projector 100' according to a third embodiment of the present invention. The projector 100' according to this embodiment is different from the projector 100 according to the first embodiment in including a light amount sensor 306. The other configuration of the projector 100' is the same as the projector 100 according to the first embodiment.

The solid-state light source 2001 used for the solid-state light source unit 201 causes a light amount to be lowered as its lighting time is longer. The fluorescent body 2052 and the optical components in the optical unit 300 are also degraded since they receive the high-intensity incident light, the wavelength conversion efficiency in the fluorescent member 2052 deteriorates, and the light transmission amount in the optical unit 300 lowers.

Accordingly, this embodiment detects the light amounts of the R light, the G light, and the B light entering the R, G, and B panels 303 to 305 using the light amount sensor 306 provided for each color light. Among the detected light amounts of the R light, the G light, and the B light, the smallest light amount is set to a reference light amount. Then, the pixel voltage, the common electrode voltage, and the ON duty cycle of the liquid crystal panel for the color of the reference light amount are set to the respective maximum values, whereas the pixel voltage, the common electrode voltage, and the ON duty cycle of the liquid crystal panel for another color are change from the maximum value.

Figure 16:
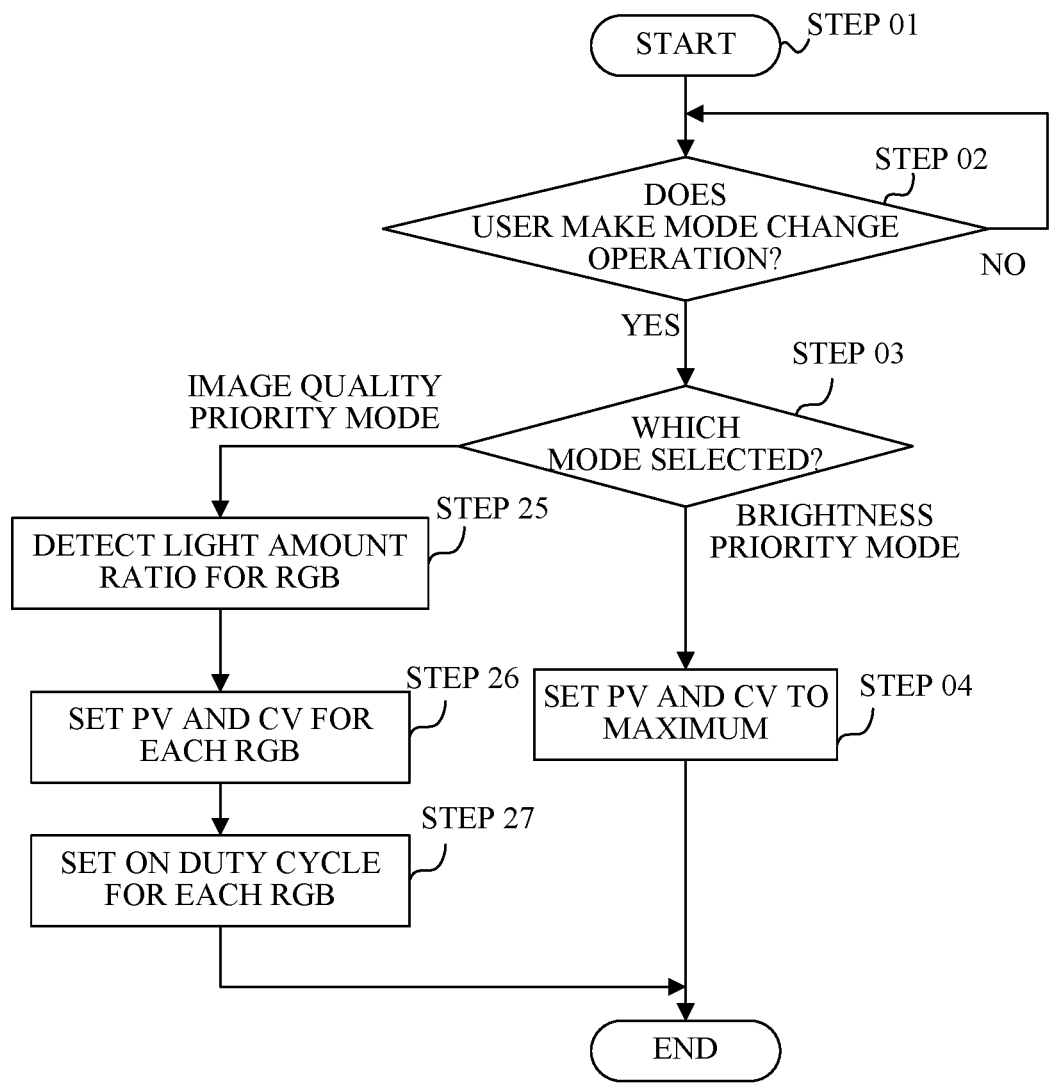
FIG. 16 is a flowchart illustrating processing performed by the projector according to the third embodiment.

Referring now to a flowchart in FIG. 16, a description will be given of the processing performed by the controller 404 according to this embodiment. Since the step 01 to the step 04 are the same as those in the first embodiment (FIG. 11), the description thereof will be omitted.

Figure 17:
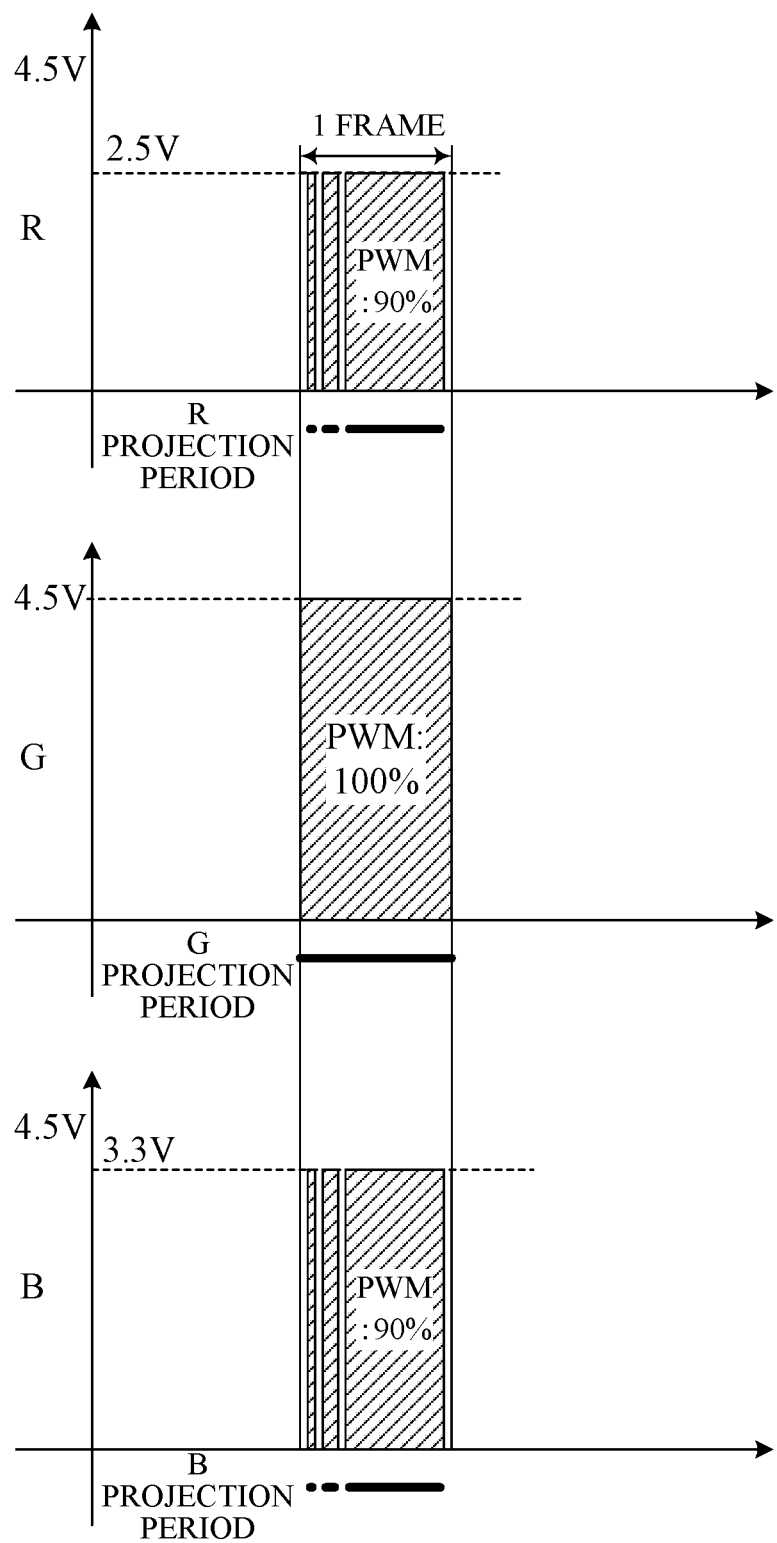
FIG. 17 illustrates PWM drives of the liquid crystal panel in the presentation mode and the sRGB mode according to the third embodiment.

This embodiment performs the processing of the step 25, when the image quality priority mode is selected in the step 03, instead of the step 05 according to the first embodiment. Referring now to FIG. 17, a description will be given of the white display processing in the step 25 to the step 27. Three vertical views illustrated in FIG. 17 show the voltages (PWM) applied to the R, G, and B panels 303 to 305 in the image quality priority mode.

In the step 25, the controller 404 detects the amounts of the R light, the G light, and the B light entering the R, G, and B panels 303 to 305 through the light amount sensor 306. Then, the controller 404 calculates the light amount ratio of the R light, the G light, and the B light (referred to as a light amount ratio hereinafter). Then, the following processing is performed in the steps 26 and 27.

Even when the detected light amounts of the R light, the G light, and the B light are lower than the initial light amounts, if the reduction amounts of the light amounts of the R light, the G light and the B light are substantially the same, the light amount ratio among the detected R light, G light, and B light has a value such as R:G:B=1:1:1 or a value close to this ratio. In this case, as illustrated in FIG. 12A, the controller 404 sets the pixel voltages of the R, G and B panels 303 to 305, the common electrode voltage Hi, and the ON duty cycle to values equal to one another (first setting state).

On the other hand, when the light amount ratio becomes, for example, R:G:B=1:0.5:0.75, the controller 404 performs the following processing. The controller 404 reduces the pixel voltages of the R and B panels 303 and 305, the common electrode voltage Hi, and the ON duty cycles from the maximum values (second setting state) so that the projected light amounts of the R light and the B light are reduced to 0.5 in accordance with the projected light amount of 0.5 of the G light as the reference light amount as illustrated in FIG. 17. At this time, the reduction amount of the ON duty cycle is limited to a range in which the color break is not visually recognized by the viewer.

Even when the light amount ratio among the R light, the G light, and the B light changes due to the deteriorations of the solid-state light source unit 201, the fluorescent body 2052, and the optical unit 300, this embodiment can maintain the image quality of the projected image required for the image quality priority mode and suppress the color break.

Each of the above embodiments discuss that the pixel voltage, the common electrode voltage, and the ON duty cycle between two liquid crystal panels out of three liquid crystal panels are made different from (lower than) one of the other liquid crystal panel. However, the pixel voltage, the common electrode voltage, and the ON duty cycle of one of the three liquid crystal panels may be different from those of the other two liquid crystal panels. In other words, the pixel voltage, the common electrode voltage, and the ON duty cycle may be set to at least one of the three liquid crystal panels differently from the others.

The present invention is applicable to an image projection apparatus that condenses different color lights on each pixel in a single liquid crystal panel using a micro lens or the like. In other words, the pixel voltage, the common electrode voltage, and the ON duty cycle for the pixels corresponding to two color lights among the pixels corresponding to the three color lights may be made different from those of the pixel corresponding to the other color light. The pixel voltage, the common electrode voltage, and the ON duty cycle of the pixel corresponding to one color light may be different from those of the pixels corresponding to the other two color lights. In other words, the pixel voltage, the common electrode voltage, and the ON duty cycle may be set to the pixel corresponding to at least one color light among the pixels corresponding to the three color lights, differently from those of the others.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-103768, filed on May 30, 2018, which is hereby incorporated by reference herein in its entirety.

What is claimed is:

1. An image projection apparatus comprising:
a plurality of light modulation elements each including a plurality of pixels, and configured to modulate lights having wavelengths different from each other; and
a driver configured to generate a first voltage commonly applied to the plurality of pixels in each of the plurality of light modulation elements, and a second voltage configured to determine a maximum value of a ratio of a light amount of exit light to a light amount of incident light of the plurality of pixels, and to drive the plurality of light modulation elements through a pulse width modulation of the second voltage for each pixel according to an input image signal,
wherein the driver sets the second voltage to at least one light modulation element among the plurality of light modulation elements, which is different from that of another light modulation element and drives the plurality of light modulation elements.

2. The image projection apparatus according to claim 1, wherein the driver drives the plurality of light modulation elements in a first setting state that sets the second voltage equally to the plurality of light modulation elements and in a second setting state that sets the second voltage to the at least one light modulation element differently from the other light modulation element.

3. The image projection apparatus according to claim 2, wherein a first image projection mode and a second image projection mode are selectable, and
wherein the driver drives the plurality of light modulation elements in the first setting state when the first image projection mode is selected, and drives the plurality of light modulation elements in the second setting state when the second image projection mode is selected.

4. The image projection apparatus according to claim 1, wherein a plurality of image projection modes are selectable, and
wherein the driver sets the second voltage to the at least one light modulation element differently from the other light modulation element when one of the plurality of image projection modes is selected.

5. The image projection apparatus according to claim 1, further comprising a light amount sensor configured to detect a light amount ratio of the different wavelengths,
wherein the driver sets the second voltage to the at least one light modulation element differently from the other light modulation element according to the light amount ratio.

6. The image projection apparatus according to claim 1, wherein the driver makes the first voltage of the at least one light modulation element different from the first voltage of the other light modulation element.

7. The image projection apparatus according to claim 6, wherein the driver changes the first voltage and the second voltage for the at least one light modulation element while maintaining a difference between the first voltage and the second voltage.

8. The image projection apparatus according to claim 1, wherein the driver uses the same pulse width modulation pattern for a gradation of image signals in a plurality of colors corresponding to the plurality of light modulation elements, and provides the pulse width modulation to the second voltage of the plurality of light modulation elements.

9. A control method of an image projection apparatus that includes a plurality of light modulation elements each having a plurality of pixels, and configured to modulate lights having wavelengths different from each other, the control method comprising the steps of:
  generating a first voltage commonly applied to the plurality of pixels in each of the plurality of light modulation elements, and a second voltage configured to determine a maximum value of a ratio of a light amount of exit light to a light amount of incident light of the plurality of pixels; and
  driving the plurality of light modulation elements through a pulse width modulation of the second voltage for each pixel according to an input image signal,
  wherein the driving step sets the second voltage to at least one light modulation element among the plurality of light modulation elements, which is different from that of another light modulation element and drives the plurality of light modulation elements.

10. A non-transitory computer-readable storage medium storing a computer program for causing a computer in an image projection apparatus to execute a control method, the image projection apparatus including a plurality of light modulation elements each having a plurality of pixels, and configured to modulate lights having wavelengths different from each other, the control method comprising the steps of:
  generating a first voltage commonly applied to the plurality of pixels in each of the plurality of light modulation elements, and a second voltage configured to determine a maximum value of a ratio of a light amount of exit light to a light amount of incident light of the plurality of pixels; and
  driving the plurality of light modulation elements through a pulse width modulation of the second voltage for each pixel according to an input image signal,
  wherein the driving step sets the second voltage to at least one light modulation element among the plurality of light modulation elements, which is different from that of another light modulation element and drives the plurality of light modulation elements.

11. An image projection apparatus comprising:
  a light modulation element having a plurality of pixels and configured to modulate light; and
  a driver configured to generate a first voltage commonly applied to the plurality of pixels in the light modulation element, and a second voltage configured to determine a maximum value of a ratio of a light amount of exit light to a light amount of incident light of the plurality of pixels, and to drive the light modulation element through a pulse width modulation of the second voltage for each pixel according to an input image signal,
  wherein the driver sets the second voltage to a pixel corresponding to light having a first wavelength among the plurality of pixels and, which is different from that of a pixel corresponding to light having a wavelength different from the first wavelength.

* * * * *